(No Model.)
J. W. BABBIT.
EVAPORATOR.
No. 315,696. Patented Apr. 14, 1885.
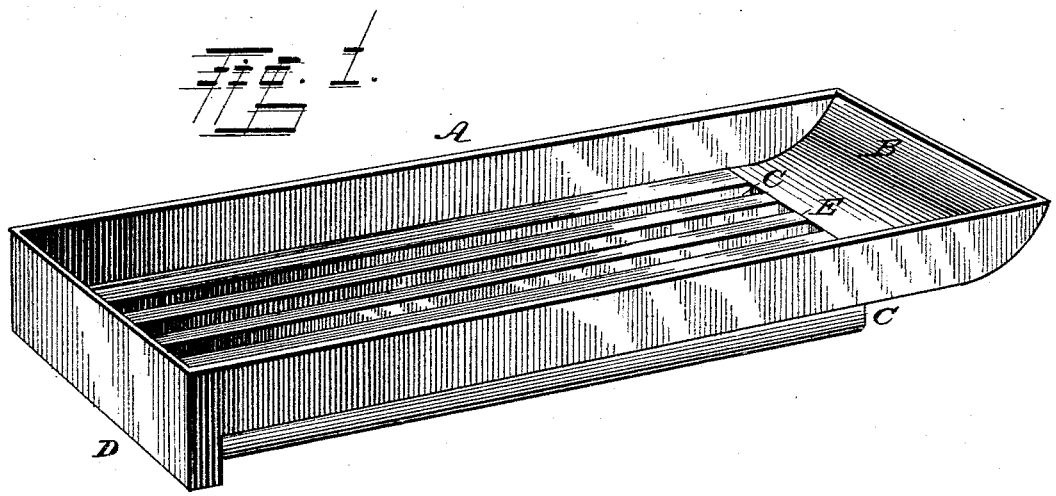
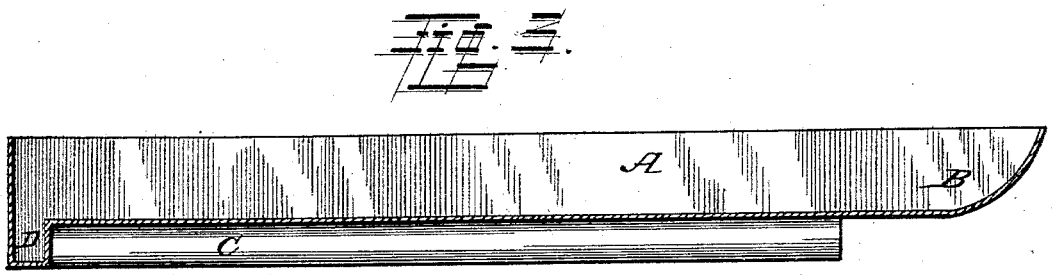
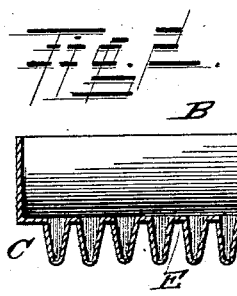
WITNESSES:
Fred. G. Dieterich.
Arthur L. Morsell.
Joseph W. Babbit
INVENTOR.
By Louis Bagger & Co.
ATTORNEYS.

UNITED STATES PATENT OFFICE.

JOSEPH W. BABBIT, OF HIAWATHA, KANSAS.

EVAPORATOR.

SPECIFICATION forming part of Letters Patent No. 315,696, dated April 14, 1885.

Application filed March 3, 1884. (No model.)

*To all whom it may concern:*

Be it known that I, JOSEPH W. BABBIT, a citizen of the United States, and a resident of Hiawatha, in the county of Brown and State of Kansas, have invented certain new and useful Improvements in Evaporators; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved evaporator. Fig. 2 is a cross-section of the same; and Fig. 3 is a longitudinal vertical section.

Similar letters of reference indicate corresponding parts in all the figures.

My invention has relation to evaporators for evaporating the juice of sugar-cane, sorghum, &c.; and it consists in the improved evaporator which will be hereinafter more fully described and claimed.

My improved evaporator is made of sheet metal, and may be of any suitable size. It consists of a flat pan, A, the bottom of which is rounded at one end, as shown at B, to adapt it for the attachment of an automatic skimmer, which works at that end of the pan. The bottom of the pan is corrugated longitudinally, so as to form deep parallel gutters C, which are intersected at the rear end of the pan by the transverse gutter D, extending from side to side. When the pan is placed over the fire in the furnace, the parallel spaces E, which separate the longitudinal gutters C, form flues, the flame and products of combustion ascending up between the gutters or depressions C. The juice contained in the pan is therefore subjected to the direct action of the heat in such a manner as to expedite the process of evaporating and crystallization, the bulk or body of the juice to be evaporated being contained in the narrow gutters or channels C.

The cross-gutter D, which connects the longitudinal parallel gutters C at the rear end of the pan, is for the purpose of drawing all the sirup from said gutters C, and, if desired, a faucet or outlet may be provided at one end of the transverse gutter for drawing off the sirup after it has been collected in the same.

I am aware that evaporator-pans have been made before with corrugated bottoms for the purpose of increasing the area of heating-surface exposed to the action of the fire; but that class of pans, as heretofore constructed, are not adapted to be used with an automatic skimmer working at one end of the pan, for the reason that in lifting the skimmer from the corrugated bottom a part of the scum is apt to run back into the pan before emptying the skimmer. This is prevented by the smooth rounded part B of my pan, in which the skimmer works, and which permits the edge of the latter, when full, to be drawn up edgewise against the said rounded end of the pan so that no scum can escape back into the pan, whether the skimmer is operated by hand or automatically by machinery.

Having thus described my improvement, what I claim, and desire to secure by Letters Patent of the United States, is—

An evaporator-pan having a longitudinally-corrugated bottom provided at one end with an intersecting transverse gutter, and abutting at the other end upon a smooth rounded and upwardly-curved section, the smooth bottom of which is on a level with the top of the raised parts formed by the corrugations in the bottom, substantially as and for the purpose herein shown and specified.

In testimony that I claim the foregoing as my own I have hereunto affixed my signature in presence of two witnesses.

JOSEPH W. BABBIT.

Witnesses:
A. SCHILLING,
C. H. JONES.